(12) United States Patent
Ye

(10) Patent No.: US 9,237,460 B2
(45) Date of Patent: Jan. 12, 2016

(54) TRAFFIC CONTROL METHOD AND DEVICE

(71) Applicant: Tencent Technology (Shenzhen) Company Limited, Shenzhen (CN)

(72) Inventor: Rungui Ye, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 2 days.

(21) Appl. No.: 14/103,731

(22) Filed: Dec. 11, 2013

(65) Prior Publication Data
US 2014/0113611 A1    Apr. 24, 2014

Related U.S. Application Data

(63) Continuation of application No. PCT/CN2013/076267, filed on May 27, 2013.

(30) Foreign Application Priority Data

Oct. 23, 2012   (CN) .......................... 2012 1 0406224

(51) Int. Cl.
| H04M 3/00 | (2006.01) |
| H04W 24/00 | (2009.01) |
| H04W 28/08 | (2009.01) |
| H04W 72/04 | (2009.01) |
| H04W 28/16 | (2009.01) |

(Continued)

(52) U.S. Cl.
CPC ............ *H04W 24/00* (2013.01); *H04L 47/2475* (2013.01); *H04W 24/02* (2013.01); *H04W 28/08* (2013.01); *H04W 28/16* (2013.01); *H04W 72/0486* (2013.01); *H04L 47/14* (2013.01)

(58) Field of Classification Search
CPC ..... H04W 36/22; H04W 24/02; H04W 24/10; H04W 4/02
USPC .......................................... 455/418
See application file for complete search history.

(56) References Cited

U.S. PATENT DOCUMENTS

| 2005/0030369 A1* | 2/2005 | Ryu ........................... 348/14.01 |
| 2012/0143694 A1* | 6/2012 | Zargahi et al. ............. 705/14.66 |

(Continued)

FOREIGN PATENT DOCUMENTS

| CN | 101404811 A | 4/2009 |
| CN | 101808407 A | 8/2010 |

(Continued)

OTHER PUBLICATIONS

Tencent Technology, ISRWO, PCT/CN2013/076267, Sep. 5, 2013, 14 pgs.

*Primary Examiner* — Khalid Shaheed
(74) *Attorney, Agent, or Firm* — Morgan, Lewis & Bockius LLP

(57) ABSTRACT

A traffic control method and device are provided. The method may include: monitoring a user behavior status of an application, where the user behavior status includes an active state or an inactive state; according to predefined correspondence between a user behavior status and a traffic control threshold, determining a traffic control threshold corresponding to the monitored user behavior status; and controlling traffic of the application by using the determined traffic control threshold. Therefore, the traffic of the application can be dynamically monitored and the intelligence of traffic control can be improved.

11 Claims, 9 Drawing Sheets

(51) Int. Cl.
*H04W 24/02* (2009.01)
*H04L 12/859* (2013.01)
*H04L 12/801* (2013.01)

(56) References Cited

U.S. PATENT DOCUMENTS

2012/0315905 A1* 12/2012 Zhu et al. ............... 455/436
2013/0067495 A1* 3/2013 Singh et al. ............. 719/318
2014/0036697 A1* 2/2014 Annan et al. ........... 370/252

FOREIGN PATENT DOCUMENTS

| CN | 102612084 A | 7/2012 |
| EP | 2234448 A1 | 9/2010 |
| WO | WO 2012071283 A1 | 5/2012 |

* cited by examiner

TRAFFIC CONTROL METHOD AND DEVICE

RELATED APPLICATIONS

This application is a continuation application of PCT Patent Application No. PCT/CN2013/076267, entitled "TRAFFIC CONTROL METHOD AND DEVICE" filed on May 27, 2013, which claims priority to Chinese Patent Application No. 201210406224.3, entitled "TRAFFIC CONTROL METHOD AND DEVICE" and filed on Oct. 23, 2012, both of which are incorporated by reference in their entirety.

TECHNICAL FIELD

The disclosed implementations relate generally to the field of network technologies, particularly to the field of network application technologies, and especially to a network traffic control method and device.

BACKGROUND

As network technologies develop, the rapid development of new network applications quickly follows suit. Some of such network applications are client applications, in which the applications communicate with servers or other clients in a network, thereby generating network traffic. For example, as cellular networks become more advanced, ever more advanced smart phone applications are developed that stream data to and from a client device such as a smart-phone. These applications allow a user of the device to watch video clips, post pictures to social media sites, play games with friends, etc., all of which generate network traffic. When network traffic generated by such applications increases abruptly, a network overload may occur, thereby lowering performance of applications and affecting their normal use. Therefore, performing traffic control on client applications is important to guaranteeing the normal use of the applications. In some conventional methods of traffic control, a traffic control threshold is employed to prevent a network overload (e.g., on the client side, in the form of an outbound traffic threshold, or on the server side, in the form of a request traffic threshold). In such methods, a maximum value of traffic (e.g., the traffic control threshold) is set for a respective client corresponding to a specific period of time (for example, the client is allowed to generate 2 megabytes per hour of traffic). When the total traffic generated by the applications of the client are less than or equal to the traffic control threshold, each application can be used in a normal mode of operation. On the other hand, when the total traffic generated by the applications of the client is greater than the traffic control threshold, network abnormality processing is performed, which can include, for example, restarting a networking program of an application or reporting abnormality information to a network server for handling.

However, in such methods, the control is performed with respect to total traffic of the client without taking into account usage differences between the various applications of the client and behavioral characteristics of the user. Conventional methods of traffic control are thus inconvenient and burdensome for users because they are blind to the behavioral characteristics of the user, which in some circumstances will indicate that a user would likely prefer that a particular application be treated differently with respect to traffic control than another application. For example, in some circumstances it may be preferable to control traffic more severely for applications running in the background, whose real-time services are less critical than an application running in the foreground.

Likewise, in some circumstances it may be preferable to control traffic less severely for applications running in the foreground.

SUMMARY

The embodiments described within the present disclosure address the aforementioned problems with conventional methods of traffic control by providing a traffic control method and device, which can dynamically monitor traffic of an application and improve the intelligence of traffic control.

Various implementations of systems, methods and devices within the scope of the appended claims each have several aspects, no single one of which is solely responsible for the attributes described herein. Without limiting the scope of the appended claims, some prominent features are described. After considering this disclosure, and particularly after considering the section entitled "Detailed Description" one will understand how the features of various implementations enable controlling traffic of clients applications by using a traffic control threshold determined in accordance with a monitored user behavior status.

According to some embodiments, a traffic control method, performed at a client device, is provided that includes monitoring a user behavior status of an application, where monitoring the user behavior status includes determining that the user behavior status is one of an active state and an inactive state. The method further includes setting a traffic control threshold in accordance with the determined user behavior status of the application, and controlling traffic of the application by using the traffic control threshold.

In some embodiments, determining the user behavior status of the application includes monitoring a current operating status of the application. When the application is currently in a foreground operating state, the user behavior status of the application is determined to be the active state. When the application is currently in a background operating state, the user behavior status of the application is determined to be the inactive state.

In some embodiments, determining that the application is in the background operating state includes determining that the application has remained in a background of the device for at least a predefined amount of time.

In some embodiments, monitoring the user behavior status of the application includes determining a current operating mode of the application. In accordance with a determination that the application is currently in a traffic control operating mode, monitoring the user behavior status further includes determining that the user behavior status of the application is the inactive state. In accordance with a determination that the application is currently not in a traffic control operating mode, monitoring the user behavior status determining that the user behavior status of the application is the active state.

In some embodiments, when the user behavior status of the user is the active state, the traffic control threshold is set to a first traffic control threshold, and when the user behavior status of the user is the inactive state, the traffic control threshold is set to a second traffic threshold that is less than the first traffic threshold.

In some embodiments, controlling the traffic of the application by using the determined traffic control threshold includes, when the traffic control threshold is set to the first traffic control threshold, controlling the traffic of the application to be less than or equal to the first traffic control threshold, and when the traffic control threshold is set to the second traffic threshold, controlling the traffic of the application to be less than or equal to the second traffic control threshold.

In some embodiments, the method further includes, when the traffic of the application is greater than a predefined value, performing network abnormality processing on the application.

Through implementation of the embodiments of the present invention, the following beneficial effects exist:

In the embodiments, the traffic control threshold is determined according to the user behavior status of the application, and the traffic of the application is controlled using the determined traffic control threshold, which can dynamically and intelligently monitor the traffic of the application, taking full account of the usage of the application and a behavior characteristic of the user in the application, thereby improving the intelligence of the traffic control, and effectively guaranteeing normal use of the application.

BRIEF DESCRIPTION OF DRAWINGS

Like reference numerals refer to corresponding parts throughout the several views of the drawings.

DETAILED DESCRIPTION

Figure 1:
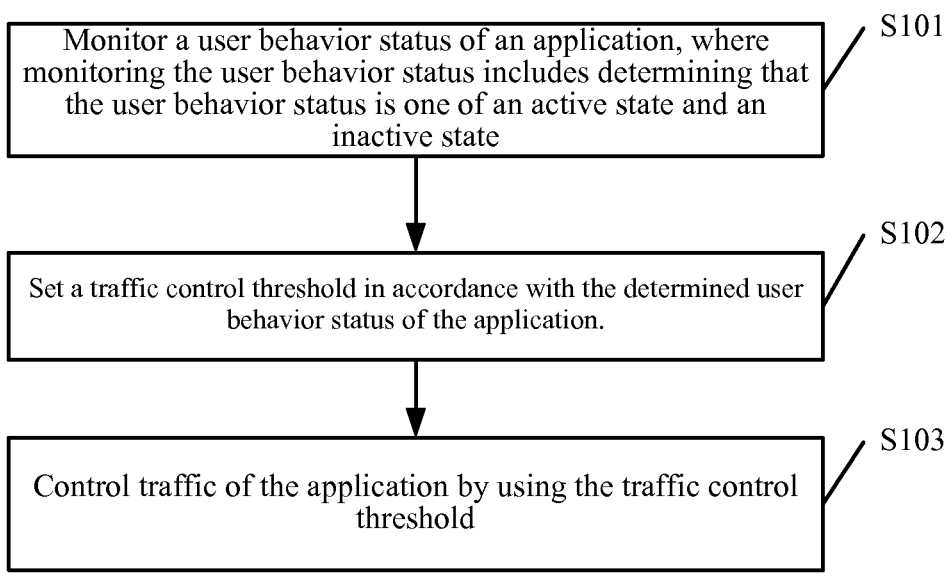
FIG. 1 is a flow chart of a traffic control method, in accordance with some embodiments.

In the embodiments of the present disclosure, an application (or "client application") refers to software capable of being installed at a client, and performing data processing through networking. Various types of such applications include, but are not limited to, instant messaging application, social networking services (SNS) application, and game applications. In some embodiments, the clients include apparatuses such as personal computers (PC), tablet computers, mobile phones, smart phones, electronic readers, notebook computer, and vehicle terminals.

In some embodiments, a user behavior status of a user is associated with a particular application. In some embodiments, the user behavior status of the user is one of an active state and an inactive state. The active state indicates that when the user uses the application, a large number of network requests are generated by the application, and consumed traffic is high. On the other hand, the inactive state indicates that when the user uses the application, a smaller number of network requests are generated by the application, and consumed traffic is low. Various ways of defining the active state and the inactive state of a given application are possible, and will be apparent to one of ordinary skill in the art. In some embodiments, the active state (or the inactive state) is predefined. For example, a request threshold may be defined for a period of time such that, when the request threshold is exceeded during the period of time, the user behavior status is determined to be the active state; otherwise, the user behavior status is the inactive state. In some implementations, the active state is defined such that when the user uses the application at the foreground of the client, that is, when the application is in a foreground operating state, it represents the active state. Conversely, when the user uses the application at the background of the client, that is, the application is in a background operating state, it represents the inactive state. In some implementations, when the user uses the application at the foreground of the client, that is, the application is in the foreground operating state, it represents the active state, and when the user uses the application at the background for a long time, (e.g., the application remains in the background operating state in excess of predefined value such as 10 minutes, or 20 minutes), it represents the inactive state. In some implementations, a traffic control option may be provided in an interface of the application, and when the user opts to perform traffic control on the application, the application enters a traffic control operating mode, which represents the inactive state. Conversely, when the user does not opts to perform traffic control (e.g., forgoes performing) on the application, it represents the active state.

A traffic control threshold refers to a maximum value of traffic that is allowed to be consumed by the application within a specified unit of time. In some embodiments, a plurality of traffic control thresholds is employed and a respective traffic control threshold of the plurality of traffic control thresholds is set in accordance with the user behavior status of the application. For example, in some embodiments, two traffic control thresholds correspond, respectively, to the active state and the inactive state. For example, the two traffic control thresholds include a first traffic control threshold and a second traffic control threshold that is less than the first traffic control threshold. In this example, there is a predefined correspondence between a user behavior status and a traffic control threshold is such that the active state corresponds to the first traffic control threshold and the inactive state corresponds to the second traffic control threshold.

Exemplary traffic control methods are provided by the embodiments of the present invention are described in detail in the following with reference to FIG. 1 to FIG. 4.

Referring to FIG. 1, FIG. 1 is a flow chart of a traffic control method 100 according to some embodiments. The method includes the operation S101 through operation S103.

S101: Monitor a user behavior status of an application, where monitoring the user behavior status includes determining that the user behavior status is one of an active state and an inactive state.

In this operation, the user behavior status of the application is determined by monitoring an operating status or an operating mode of the application. For example, when the application is detected in a foreground operating state, the user behavior status is set to the active state. When the application is detected a background operating state, user behavior status is set to the inactive state. In some embodiments, the user behavior status of the application is also determined by monitoring the operating mode of the application. For example, when an application includes a traffic control option, the client device detects whether the user has selected the traffic control option (e.g., whether the application is in a traffic control operating mode). When it is detected that the application is currently in the traffic control operating mode, the user behavior status is set to the active state; otherwise, the user behavior status is set to the inactive state.

S102: Set a traffic control threshold in accordance with the determined user behavior status of the application.

As mentioned above, in some embodiments, there is a predefined correspondence between the user behavior status and the traffic control threshold. For example, the active state corresponds to the first traffic control threshold and the inactive state corresponds to the second traffic control threshold. Because many network requests are generated by the application and consumed traffic is high in the active state, as compared to the inactive state, the first traffic control threshold is set to a greater value than the second traffic control threshold. For example, in some embodiments, the first traffic control threshold is 8 megabytes (Mb)/hour and the second traffic control threshold is 2 Mb/hour.

S103: Control traffic of the application by using the traffic control threshold.

The specific control process of this operation is that: when the user behavior status of the application is the active state, the traffic of the application is controlled to be less than or equal to the first traffic control threshold. When the user behavior status of the application is the inactive state, the traffic of the application is controlled to be less than or equal to the second traffic control threshold.

Figure 2:
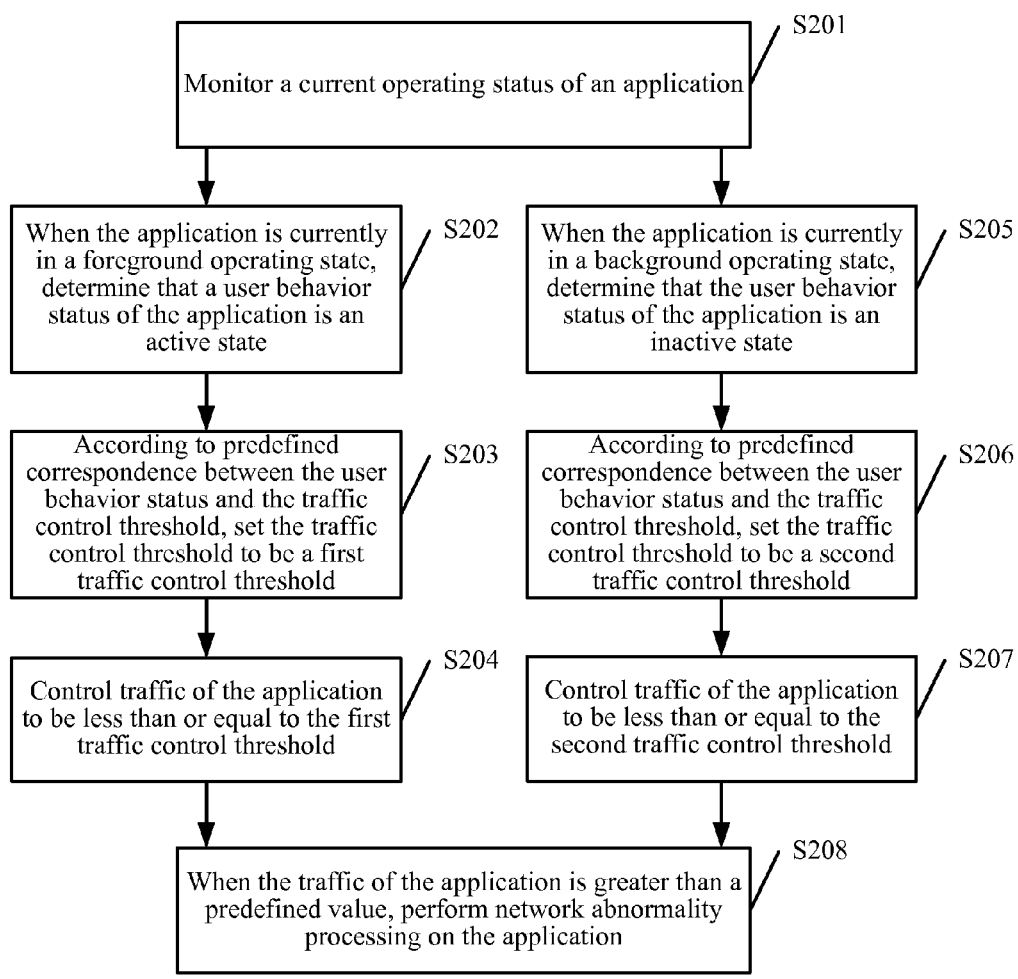
FIG. 2 is a flow chart of a traffic control method, in accordance with some embodiments.

Referring to FIG. 2, FIG. 2 is a flow chart of a traffic control method 200, in accordance with some embodiments. The method includes the following operation S201 through operation S208.

S201: Monitor a current operating status of an application.

S202: When the application is currently in a foreground operating state, determine that a user behavior status of the application is an active state.

S203: According to a predefined correspondence between the user behavior status and a traffic control threshold, set the traffic control threshold to be a first traffic control threshold.

S204: Control traffic of the application to be less than or equal to the first traffic control threshold, and then turn to operation S208.

S205: When the application is currently in a background operating state, determine that the user behavior status of the application is an inactive state.

S206: According to the predefined correspondence between the user behavior status and the traffic control threshold, set the traffic control threshold to be a second traffic control threshold.

S207: Control traffic of the application to be less than or equal to the second traffic control threshold, and then turn to operation S208.

S208: When the traffic of the application is greater than a predefined value, perform network abnormality processing on the application.

In some embodiments, the predefined value is set according to a network status. For example, the predefined value is set in accordance with one of the following, or a combination thereof: a bandwidth supported by a network, a processing capacity of a network server, a data transmission capacity of the network. The predefined value indicates a maximum value of traffic of the application that is acceptable by the network and is allowed to be consumed in a specified amount of time. In some embodiments, the predefined value is equal to the first traffic control threshold. When current traffic of the application is less than or equal to the predefined value, (e.g., traffic consumed by network requests from the application is less than or equal to the predefined value), the current traffic is in a normal processing range of the network, and the network will run normally. When the traffic of the application is greater than the predefined value, the current traffic exceeds a normal processing range of the network, the network is overloaded, and the network is abnormal. At this time, the network abnormality processing needs to be performed on the application. In some embodiments, the network abnormality processing includes, but is not limited to, restarting a networking program of the application, reporting abnormality information to a network server, and so on.

The following is an example of the traffic control method 200 with the following exemplary details: the application is an instant messaging application, the predefined value is 8 Mb/hour, the first traffic control threshold is 8 Mb/hour, and the second traffic control threshold is 2 Mb/hour. When a user does not use the instant messaging application, traffic of the instant messaging application is very small (e.g., close or equal to zero). As the user uses the instant messaging application, the number of network requests generated by the instant messaging application is increased and the consumed traffic is also increased. Under these exemplary circumstances, the traffic control method 200 proceeds as follows, in accordance with some embodiments:

An operating status of the instant messaging application is monitored. When it is detected that the instant messaging application is currently in a foreground operating state, it is determined that a user behavior status of the user in the instant messaging application is the active state, and it is determined that the first traffic control threshold of 8 Mb/hour is to be used to control the traffic of the instant messaging application, that is, the traffic consumed by the instant messaging application is controlled to be less than or equal to 8 Mb/hour.

When it is detected that the instant messaging application is currently in a background operating state, it is determined that the user behavior status of the user in the instant messaging application is an inactive state, and it is determined that the second traffic control threshold of 2 Mb/hour is to be used to control the traffic of the instant messaging application, that is, the traffic consumed by the instant messaging application is controlled to be less than or equal to 2 Mb/hour.

When the traffic of the instant messaging application consumed in one hour reaches 8 Mb (e.g., within the previous hour, or within a fixed one hour period), and the number of network requests of the instant messaging application is still increased in the one hour, (e.g., the consumed traffic is still increased, so that the traffic of the instant messaging application is greater than 8 Mb/hour) network abnormality processing is performed on the instant messaging application.

Figure 3:
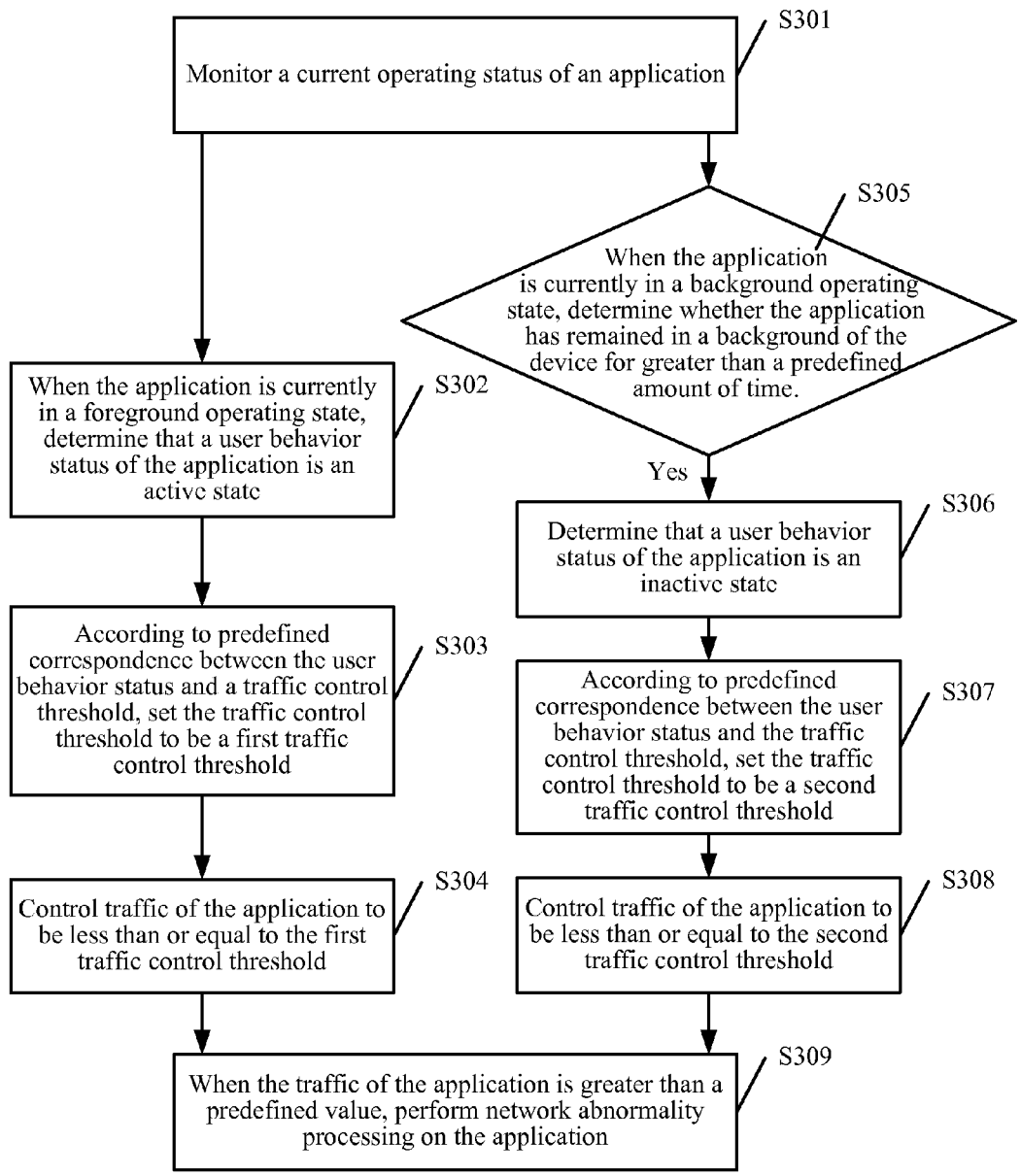
FIG. 3 is a flow chart of a traffic control method, in accordance with some embodiments.

Referring to FIG. 3, FIG. 3 is a flow chart of a traffic control method 300 according to some embodiments. Method 300 includes the following operations S301 through operation S309.

S301: Monitor a current operating status of an application.

S302: When the application is currently in a foreground operating state, determine that a user behavior status of the application is an active state.

S303: According to predefined correspondence between the user behavior status and a traffic control threshold, set the traffic control threshold to be a first traffic control threshold.

S304: Control traffic of the application to be less than or equal to the first traffic control threshold, and then turn to operation S309.

S305: When the application is currently in a background operating state, determine whether the application has remained in a background of the device for at least a predefined amount of time. When yes, turn to operation S306; otherwise, end the procedure.

In this operation, the time threshold may be set as required. For example, the time threshold may be set as 20 minutes according to a use habit of the user. When the duration that the application has remained in the background operating state exceeds 20 minutes (e.g., the application is switched from the foreground operating state to the background operating state and remains in the background state for in excess of 20 minutes), it is determined that the user behavior status of the application is the inactive state. Alternatively, during the interval when the application has remained in the background operating state for less than 20 minutes (e.g., the application is switched from the foreground operating state to the background operating state and the duration that the background operating state is less than 20 minutes), it is determined that the user behavior status of the application is the active state. The time threshold is set so as to avoid resource loss owing to frequent switching between the active state and the inactive state in circumstances where the user performs frequent foreground-background switching on the application, thereby ensuring system performance and network stability. Thus, operation S305 provides a hysteresis in switching between the active and inactive statuses.

S306: Determine that the user behavior status of the application is an inactive state.

S307: According to predefined correspondence between the user behavior status and the traffic control threshold, set the traffic control threshold to be a second traffic control threshold.

S308: Control traffic of the application to be less than or equal to the second traffic control threshold, and then turn to operation S309.

S309: When the traffic of the application is greater than a predefined value, perform network abnormality processing on the application.

In some embodiments, for operation S309, reference may be made to operation S208 in the embodiment shown in FIG. 2, the details of which are not repeated here.

The following is an example of the traffic control method 300 with the following exemplary details: the application is an instant messaging application, the predefined value is 8 Mb/hour, the first traffic control threshold is 8 Mb/hour, the second traffic control threshold is 2 Mb/hour, and the predefined time threshold is 20 minutes. When a user does not use the instant messaging application, traffic of the instant messaging application is 0 Mb/hour. As the user uses the instant messaging application, the number of network requests generated by the instant messaging application is increased and consumed traffic is increased. Under these exemplary circumstances, the traffic control method 300 proceeds as follows, in accordance with some embodiments:

An operating status of the instant messaging application is monitored. When it is detected that the instant messaging application is currently in a foreground operating state, it is determined that the user behavior status of the user in the instant messaging application is the active state, and it is determined that the first traffic control threshold 8 Mb/hour is used to control the traffic of the instant messaging application (e.g., the traffic consumed by the instant messaging application is controlled to be less than or equal to 8 Mb/hour).

When it is detected that the instant messaging application is currently in the background operating state, a determination is made as to whether the instant messaging application has remained in background operating state for in excess of 20 minutes. When the instant messaging application has not remained in background operating state for in excess of 20 minutes, no processing is performed. When the instant messaging application has remained in background operating state for in excess of 20 minutes, it is determined that the user behavior status of the user in the instant messaging application is the inactive state, and it is determined that the second traffic control threshold of 2 Mb/hour is to be used to control the traffic of the instant messaging application (e.g., the traffic consumed by the instant messaging application is controlled to be less than or equal to 2 Mb/hour).

When the traffic of the instant messaging application consumed in one hour reaches 8 Mb, and the number of network requests of the instant messaging application is still increased in the one hour, (e.g., the consumed traffic is still increased, so that the traffic of the instant messaging application is greater than 8 Mb/hour), network abnormality processing is performed on the instant messaging application.

Figure 4:
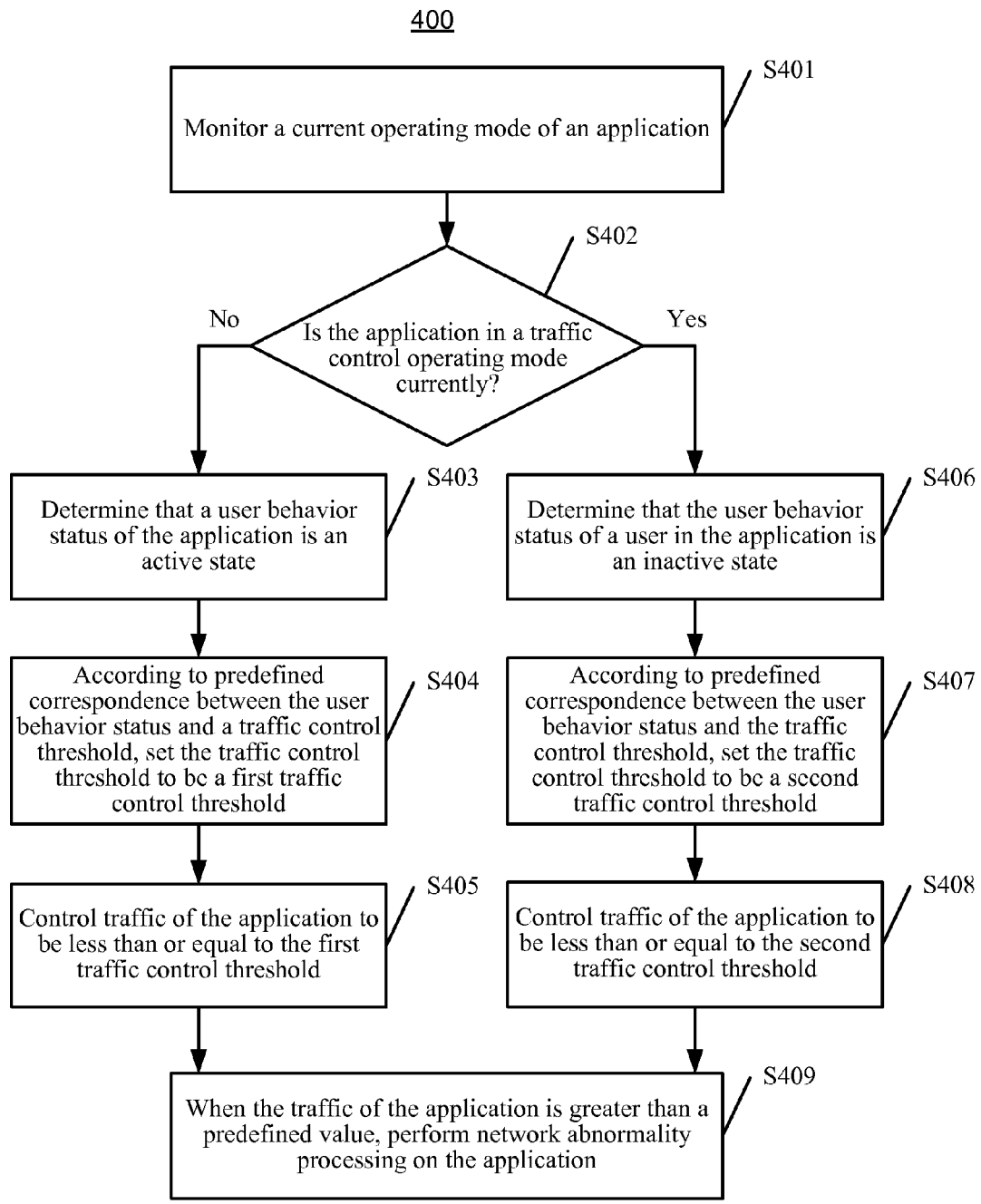
FIG. 4 is a flow chart of a traffic control method, in accordance with some embodiments.

Referring to FIG. 4, FIG. 4 is a flow chart of a traffic control method 400 according to some embodiments. Method 400 includes the following operations S401 through operation S409.

S401: Monitor a current operating mode of an application.

In some embodiments, a traffic control option is provided in an interface of the application, and when the user opts to perform traffic control on the application, the application enters a traffic control operating mode. This operation can detect whether the user selects the traffic control option. When it is detected that the user selects the traffic control option, it is determined that the application is in traffic control operating mode. Otherwise, it is determined that the application is in a non-traffic control operating mode.

S402: Determine whether the application is currently in a traffic control operating mode. When the application is not currently in the traffic control operating mode, turn to operation S403. Otherwise, turn to operation S406.

S403: Determine that a user behavior status of the application is an active state.

S404: According to predefined correspondence between the user behavior status and a traffic control threshold, set the traffic control threshold to be a first traffic control threshold.

S405: Control traffic of the application to be less than or equal to the first traffic control threshold, and then turn to operation S409.

S406: Determine that the user behavior status of the application is an inactive state.

S407: According to predefined correspondence between the user behavior status and the traffic control threshold, set the traffic control threshold to be a second traffic control threshold.

S408: Control traffic of the application to be less than or equal to the second traffic control threshold, and then turn to operation S409.

S409: When the traffic of the application is greater than a predefined value, perform network abnormality processing on the application.

In some embodiments, for operation S409, reference may be made to operation S208 in the embodiment shown in FIG. 2, the details of which are not repeated here.

The following is an example of the traffic control method 400 with the following exemplary details: the application is an instant messaging application, a predefined value is 8 Mb/hour, a first traffic control threshold is 8 Mb/hour, and a second traffic control threshold is 2 Mb/hour. When a user does not use the instant messaging application, traffic of the instant messaging application is 0 Mb/hour. As the user uses the instant messaging application, the number of network requests generated by the instant messaging application is increased and consumed traffic is increased. Under these exemplary circumstances, the traffic control method 400 proceeds as follows, in accordance with some embodiments:

An operating mode of the instant messaging application is monitored. When it is detected that the instant messaging application is currently in the non-traffic control operating mode, it is determined that the user behavior status of the user in the instant messaging application is the active state, and it is determined that the first traffic control threshold 8 Mb/hour is to be used to control the traffic of the instant messaging application, (e.g., the traffic consumed by the instant messaging application is controlled to be less than or equal to 8 Mb/hour).

When it is detected that the instant messaging application is currently in the traffic control operating mode, it is determined that the user behavior status of the user in the instant messaging application is the inactive state, and it is consequently determined that the second traffic control threshold 2 Mb/hour is to be used to control the traffic of the instant messaging application, (e.g., the traffic consumed by the instant messaging application is controlled to be less than or equal to 2 Mb/hour).

When the traffic of the instant messaging application consumed in one hour reaches 8 Mb, and the number of network requests of the instant messaging application is still increased in the one hour, (e.g., the consumed traffic is still increased, so that the traffic of the instant messaging application is greater than 8 Mb/hour), network abnormality processing is performed on the instant messaging application.

In accordance with some embodiments of the foregoing methods (e.g., methods 100, 200, 300, and 400), a traffic control threshold is determined according to a user behavior status of a user in a application, and the traffic of the application is controlled by using the determined traffic control threshold, which can dynamically and intelligently monitor the traffic of the application, take full account of the usage of the application and a behavior characteristic of the user in the application, thus improving the intelligence of the traffic control, and effectively guaranteeing normal use of the application.

In accordance with some embodiments, a traffic control device is provided in the following description with reference to FIG. 5 to FIG. 9. In some embodiments, the traffic control device is a client device that is independent of an application. In some embodiments, the traffic control device is a module of the application. It should be noted that, the following device may be applied in the foregoing methods (e.g., methods 100, 200, 300, and 400).

Figure 5:
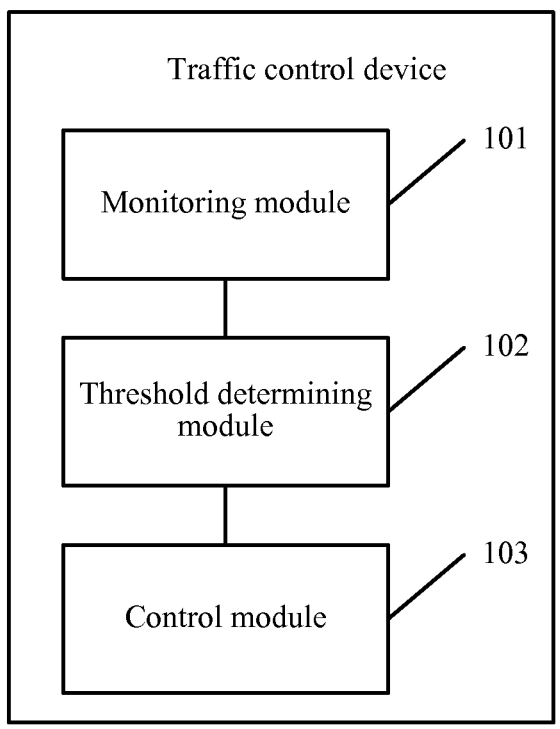
FIG. 5 is a schematic structural diagram of a traffic control device, in accordance with some embodiments.

Referring to FIG. 5, FIG. 5 is a schematic structural diagram of a traffic control device 500 according to some embodiments. The device 500 includes a monitoring module 101, a threshold determining module 102, and a control module 103.

The monitoring module 101 is configured to monitor a user behavior status of an application, where the user behavior status includes an active state or an inactive state.

Figure 6:
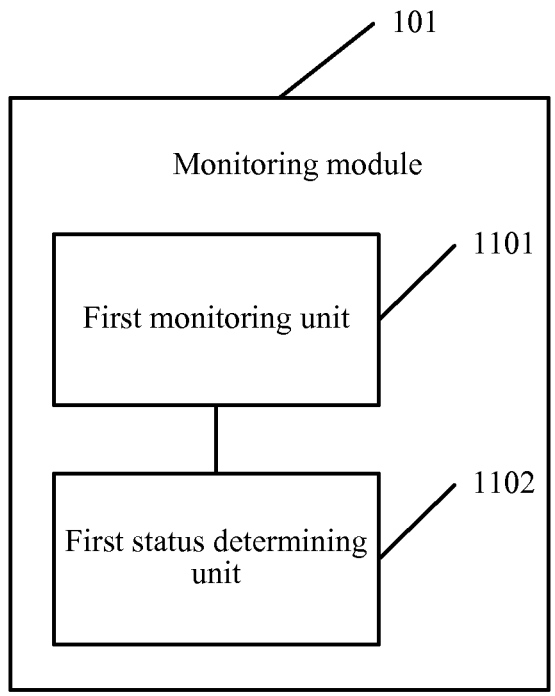
FIG. 6 is a schematic structural diagram of an embodiment of a monitoring module shown in FIG. 5, in accordance with some embodiments.

In some embodiments, the monitoring module 101 includes one or more the following three implementations, or combinations thereof, where the first implementation manner is described as follows:

With reference to FIG. 6, FIG. 6 is a schematic structural diagram of the monitoring module 101 shown in FIG. 5, in accordance with some embodiments. The monitoring module includes a first monitoring unit 1101 and a first status determining unit 1102.

The first monitoring unit 1101 is configured to monitor a current operating status of the application.

The first status determining unit 1102 is configured to: when the application is currently in a foreground operating state, determine that the user behavior status of the application is the active state, and, when the application is currently in a background operating state, determine that the user behavior status of the application is the inactive state.

Figure 7:
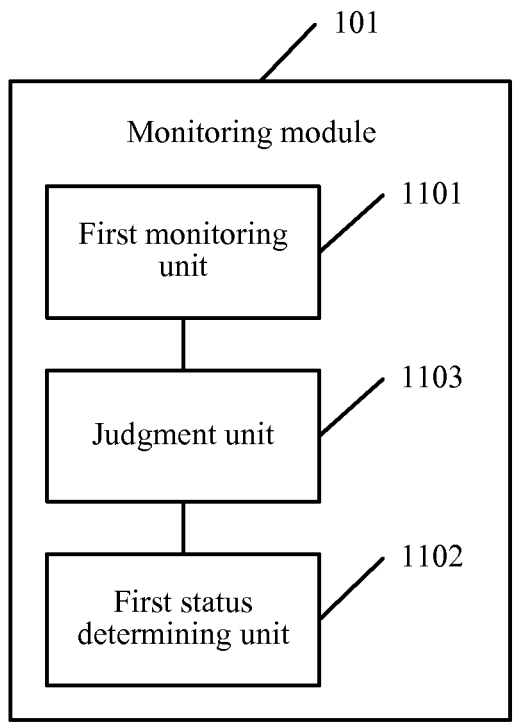
FIG. 7 is a schematic structural diagram of an embodiment of a monitoring module shown in FIG. 5, in accordance with some embodiments.

The second implementation manner is described as follows:

With reference to FIG. 7, FIG. 7 is a schematic structural diagram the monitoring module 101 shown in FIG. 5, in accordance with some embodiments. The monitoring module includes a first monitoring unit 1101, a first status determining unit 1102, and a judgment unit 1103. For structures of the first monitoring unit 1101 and the first status determining unit 1102, reference may be made to relevant descriptions of the embodiment shown in FIG. 6, which are not elaborated herein.

The judgment unit 1103 is configured to: when the first monitoring unit detects that the application is currently in the background operating state, judge whether a duration that the application has remained in background operating state exceeds a predefined time threshold, and when a judgment result is yes, notify the first status determining unit of the determination that the user behavior status of the application is the inactive state.

Figure 8:
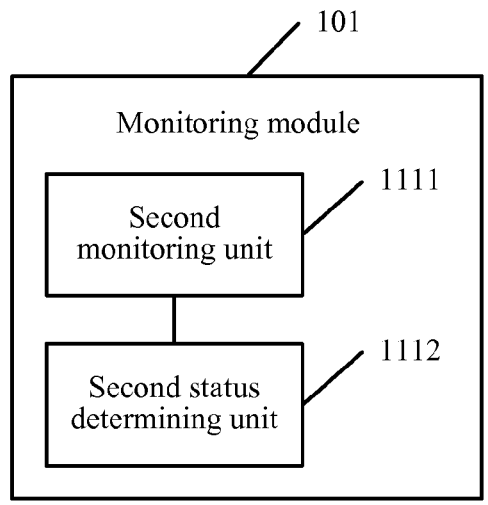
FIG. 8 is a schematic structural diagram of an embodiment of a monitoring module shown in FIG. 5, in accordance with some embodiments.

The third implementation manner is described as follows:

With reference to FIG. 8, FIG. 8 is a schematic structural diagram the monitoring module shown in FIG. 5. in accordance with some embodiments. The monitoring module includes a second monitoring unit 1111 and a second status determining unit 1112.

The second monitoring unit 1111 is configured to monitor a current operating mode of the application.

The second status determining unit 1112 is configured to: when the application is currently in a traffic control operating mode, determine that the user behavior status of the application is the inactive state; otherwise, determine that the user behavior status of the application is the active state.

The threshold determining module 102 is configured to: according to predefined correspondence between the user behavior status and a traffic control threshold, determine the traffic control threshold corresponding to the monitored user behavior status.

In some embodiments, the predefined correspondence between the user behavior status and the traffic control threshold is that, the active state corresponds to a first traffic control threshold and the inactive state corresponds to a second traffic control threshold that is less than the first traffic control threshold. Because many network requests are generated by the application and consumed traffic is high in the active state, and fewer network requests are generated by the application and the consumed traffic is low in the inactive state, the first traffic control threshold is set to be greater than the second traffic control threshold. For example, in some circumstances, the first traffic control threshold is 8 Mb/hour and the second traffic control threshold is 2 Mb/hour.

The control module 103 is configured to control traffic of the application by using the determined traffic control threshold.

A specific control process of this operation is: when the user behavior status of the application is the active state, controlling the traffic of the application to be less than or equal to the first traffic control threshold. Conversely, when the user behavior status of the application is the inactive state, controlling the traffic of the application to be less than or equal to the second traffic control threshold.

Figure 9:
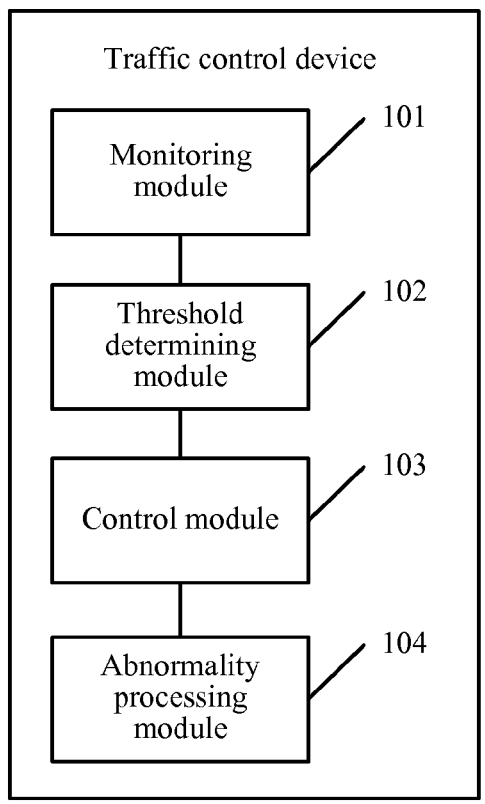
FIG. 9 is a schematic structural diagram of a traffic control device, in accordance with some embodiments.

Referring to FIG. 9, FIG. 9 is a schematic structural diagram a traffic control device according to some embodiment. The device includes a monitoring module 101, a threshold determining module 102, a control module 103, and an abnormality processing module 104. The monitoring module 101, the threshold determining module 102, and the control module 103, are analogous to those described with reference to FIG. 5 through FIG. 8, the details of which are not elaborated here.

The abnormality processing module 104 is configured to: when the traffic of the application is greater than a predefined value, perform network abnormality processing on the application.

In some embodiments, the predefined value is set in accordance with a network status. For example, the predefined value is set in accordance with a bandwidth supported by a network, a processing capacity of a network server, a data transmission capacity of the network, or a combination thereof. The predefined value indicates a maximum value of traffic of the application that can be accepted by the network and is allowed to be consumed in unit time. In some embodiments, the predefined value is equal to a first traffic control threshold. When the traffic of the application is less than or equal to the predefined value, (e.g., traffic consumed by network requests of the application is less than or equal to the predefined value), the current traffic is in a normal processing range of the network, and the network runs normally. When the traffic of the application is greater than the predefined value, current traffic exceeds the normal processing range of the network, the network is overloaded, and the network is abnormal. At this time, network abnormality processing is performed on the application. A manner of the network abnormality processing performed by the abnormality processing module 104 includes, but is not limited to, restarting a networking program of the application, reporting abnormality information to a network server, and so on.

It should be noted that, a function of each function module of the traffic control device in the embodiments of the present invention may be specifically implemented according to the method in the foregoing method embodiments, and for a specific implementation process, reference may be made to relevant descriptions in the foregoing method embodiments, which are not elaborated herein.

Figure 10:
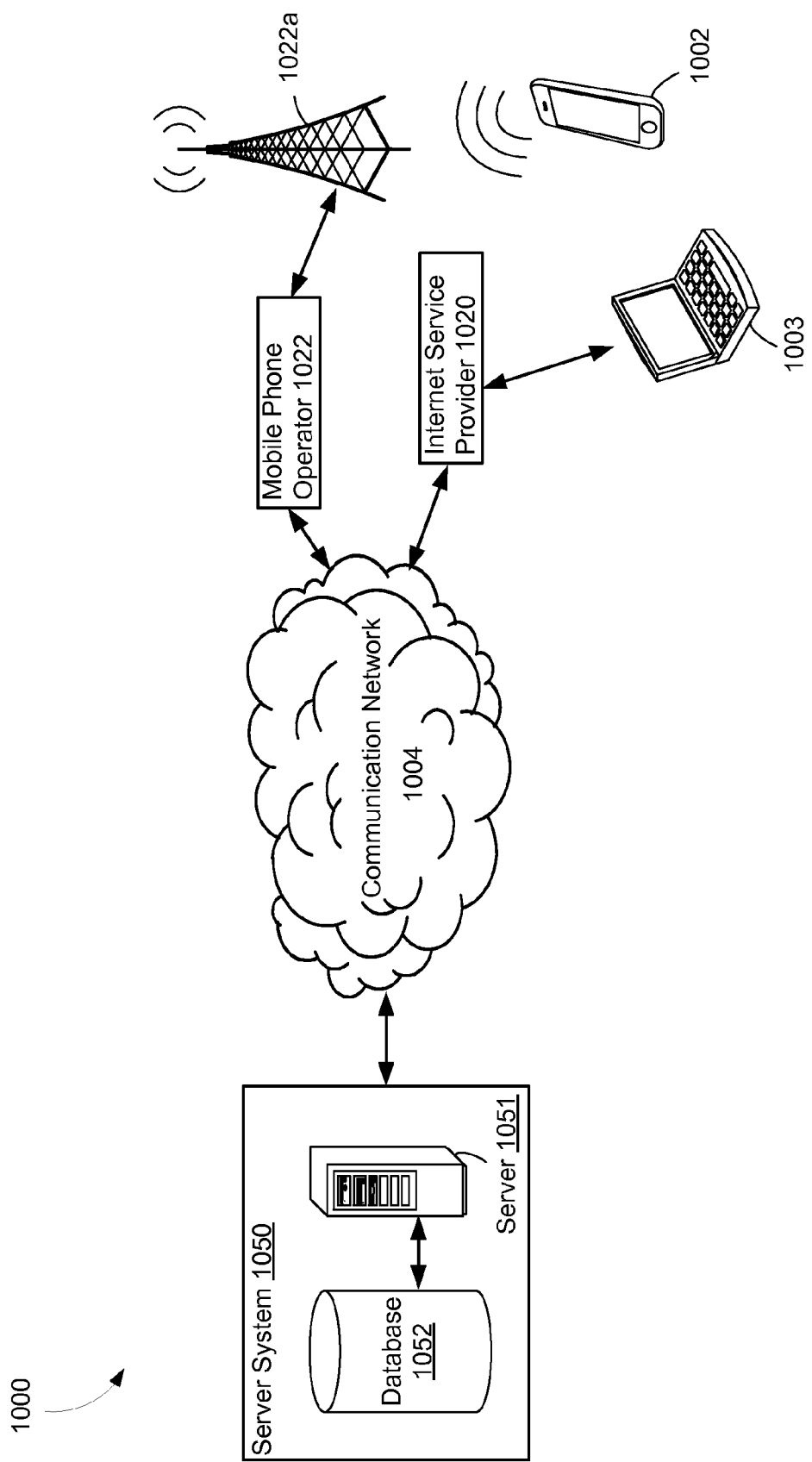
FIG. 10 is a diagram of a client-server environment, in accordance with some implementations.

FIG. 10 is a diagram of a client-server environment 1000 in accordance with some implementations. While certain specific features are illustrated, those skilled in the art will appreciate from the present disclosure that various other features have not been illustrated for the sake of brevity and so as not to obscure more pertinent aspects of the implementations disclosed herein. To that end, the client-server environment 1000 includes a server system 1050, a mobile phone operator 1022 (i.e., wireless carrier), an internet service provider 1020, and a communications network 104. Each of the server system 1050, the mobile phone operator 1022 (i.e. wireless carrier), and the internet service provider 1020 are capable of being connected to the communication network 1004 in order to exchange information with one another and/or other devices and systems. Within the server system 1050, there is a server computer 1051 for receiving and processing the data received from the client devices 1002 and 1003. Additionally, the mobile phone operator 1022 and the internet service provider 1020 are operable to connect client devices to the communication network 1004 as well. For example, a smart phone 1002 is operable with the network of the mobile phone operator 1022, which includes for example, a base station 1022a. Similarly, for example, a laptop computer 1003 (or tablet, desktop, workstation or the like) is connectable to the network provided by the internet service provider 1020, which is ultimately connectable to the communication network 104. Moreover, while FIG. 10 only includes one of each of the aforementioned devices and systems, those skilled in the art will appreciate from the present disclosure that any number of such devices and/or systems may be provided in a client-server environment, and particular devices may be altogether absent. In other words, the client-server environment 1000 is merely an example provided to discuss more pertinent features of the present disclosure.

The communication network 1004 may be any combination of wired and wireless local area network (LAN) and/or wide area network (WAN), such as an intranet, an extranet, including a portion of the Internet. It is sufficient that the communication network 1004 provides communication capability between client devices and servers. In some implementations, the communication network 1004 uses the HyperText Transport Protocol (HTTP) to transport information using the Transmission Control Protocol/Internet Protocol (TCP/IP). HTTP permits a client device to access various resources available via the communication network 1004. However, the various implementations described herein are not limited to the use of any particular protocol.

As discussed below in greater detail with reference to FIG. 11, some client devices, such as the laptop 1003 and smart phone 1002, include a display and a digital camera. In some implementations, a mobile application is operated at least in part by the client device. In operation, the mobile application (e.g., a client application) may interact with the network and one or more hardware elements (e.g., the digital camera) to produce network traffic. For example, a user a smart phone 1002 may take a picture with a digital camera of the smart phone and post it to a social networking service via communication network 1004.

Figure 11:
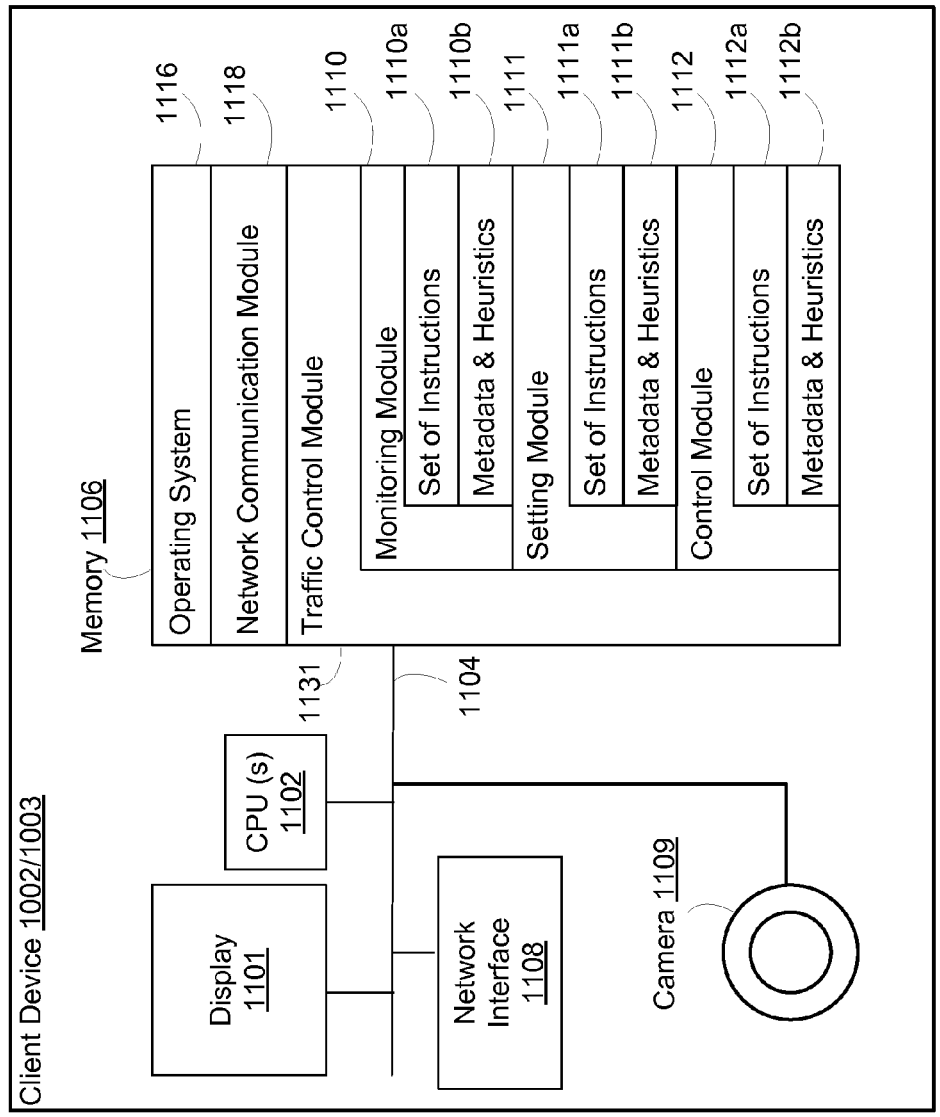
FIG. 11 is a diagram of an example implementation of a client device in accordance with some implementations.

FIG. 11 is a diagram of an example implementation of a client device 1002/1003 (e.g., laptop 1003 and smart phone 1002), discussed above with reference to FIG. 10, in accordance with some implementations. While certain specific features are illustrated, those skilled in the art will appreciate from the present disclosure that various other features have not been illustrated for the sake of brevity and so as not to obscure more pertinent aspects of the implementations disclosed herein. To that end, the client device 1002/1003 includes one or more processing units (CPU's) 1102, one or more network or other communications interfaces 1108, a display 1101, memory 1106, a digital camera 1109, and one or more communication buses for interconnecting these and various other components. The communication buses may include circuitry (sometimes called a chipset) that interconnects and controls communications between system components. The memory 1106 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 1106 may optionally include one or more storage devices remotely located from the CPU(s) 1102. The memory 1106, including the non-volatile and volatile memory device(s) within the memory 1106, comprises a non-transitory computer readable storage medium.

In some implementations, the memory 1106 or the non-transitory computer readable storage medium of the memory 1106 stores the following programs, modules and data structures, or a subset thereof including an operating system 1116, a network communication module 1118, and a traffic control module 1131.

The operating system 1116 includes procedures for handling various basic system services and for performing hardware dependent tasks.

The network communication module 1118 facilitates communication with other devices via the one or more communication network interfaces 1108 (wired or wireless) and one or more communication networks, such as the internet, other wide area networks, local area networks, metropolitan area networks, and so on.

The traffic control module 1131 is configured to control network traffic (e.g., over network 1004) originating from one or more client applications on client device 1002/1003 based at least in part on a user behavior status of a user using client device 1002. To that end, the traffic control 1131 includes an monitoring module 1110 for monitoring a user behavior status of the user, a setting module 1111 for setting a traffic control threshold in accordance with the user behavior status of the user, and a control module 1112 for controlling traffic over the network from the application in accordance with the set traffic control threshold. To that end, the monitoring module 1110 includes a set of instructions 1110a and heuristics and metadata 1110b (metadata could include, for example, a register indicating whether the user has opted to perform traffic control management). Similarly, the setting module 1111 includes a set of instructions 1111a as well as metadata and heuristics 1111b, and control module 1112 includes a set of instructions 1112a and metadata and heuristics 1112b.

Through the descriptions of the foregoing device embodiments, in the embodiments of the present invention, the traffic control threshold is determined according to the user behavior status of the application, and the traffic of the application is controlled by using the determined traffic control threshold, which can dynamically and intelligently monitor the traffic of the application, take full account of the usage of the application and a behavior characteristic of the user in the application, improve the intelligence of the traffic control, and effectively guarantee normal use of the application.

Persons of ordinary skill in the art may understand that all or a part of the processes of the foregoing method embodiments may be completed by a computer program instructing relevant hardware. The program may be stored in a computer readable storage medium. When the program is run, the processes of the foregoing method embodiments are performed. The storage medium may be a magnetic disk, an optical disk, a Read-Only Memory (ROM), a Random Access Memory (RAM), and the like.

The foregoing disclosures are only exemplary embodiments of the present invention, and are definitely not intended to limit the protection scope of the present invention; therefore, any equivalent change made according to the claims of the present invention still falls within the scope of the present invention.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "when" may be construed to mean "when" or "upon" or "in response to determining" or "in accordance with a determination" or "in response to detecting," that a stated condition precedent is true, depending on the context. Similarly, the phrase "when it is determined [that a stated condition precedent is true]" or "when [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method of controlling network traffic from an application running on a client device, the method comprising:
at a client device:
determining whether the application is in a user-selected traffic control operating mode;

when the application is in the user-selected traffic control operating mode, performing traffic control on the application, the traffic control including:
monitoring a user behavior status of the application, wherein monitoring the user behavior status includes determining that the user behavior status is one of an active state and an inactive state, and wherein determining the user behavior status of the application comprises:
monitoring a current operating status of the application;
when the application is currently in a foreground operating state, determining that the user behavior status of the application is the active state; and
when the application is currently in a background operating state, determining that the user behavior status of the application is the inactive state;
setting a traffic control threshold in accordance with the determined user behavior status of the application; and
controlling traffic of the application by using the traffic control threshold;
wherein:
when the user behavior status of the user is the active state, the traffic control threshold is set to a first traffic control threshold; and
when the user behavior status of the user is the inactive state, the traffic control threshold is set to a second traffic threshold that is less than the first traffic threshold
when the application is not in the user-selected traffic control operating mode, forgoing performing the traffic control on the application.

2. The method according to claim 1, wherein determining that the application is in the background operating state includes determining that the application has remained in a background of the client device for at least a predefined amount of time.

3. The method according to claim 1, wherein controlling the traffic of the application by using the determined traffic control threshold comprises:
when the traffic control threshold is set to the first traffic control threshold, controlling the traffic of the application to be less than or equal to the first traffic control threshold; and
when the traffic control threshold is set to the second traffic threshold, controlling the traffic of the application to be less than or equal to the second traffic control threshold.

4. The method according to claim 3, further comprising: when the traffic of the application is greater than a predefined value, performing network abnormality processing on the application.

5. A device configured to control network traffic comprising:
one or more processors;
a network interface; and
memory including instructions that, when executed by the one or more processors, cause the device to:
determine whether an application is in a user-selected traffic control operating mode;
when the application is in the user-selected traffic control operating mode, perform traffic control on the application, the traffic control including:
monitor a user behavior status of the application, wherein monitoring the user behavior status includes determining that the user behavior status is one of an active state and an inactive state, and wherein determining the user behavior status of the application comprises:
monitoring a current operating status of the application;
when the application is currently in a foreground operating state, determining that the user behavior status of the application is the active state; and
when the application is currently in a background operating state, determining that the user behavior status of the application is the inactive state;
set a traffic control threshold in accordance with the determined user behavior status of the application; and
control traffic of the application by using the traffic control threshold;
wherein:
when the user behavior status of the user is the active state, the traffic control threshold is set to a first traffic control threshold; and
when the user behavior status of the user is the inactive state, the traffic control threshold is set to a second traffic threshold that is less than the first traffic threshold
when the application is not in the user-selected traffic control operating mode, forgo performing the traffic control on the application.

6. The device according to claim 5, wherein the instruction for determining that the application is in the background operating state includes instructions for determining that the application has remained in a background of the device for at least a predefined amount of time.

7. The device according to claim 5, wherein the instruction for controlling the traffic of the application by using the determined traffic control threshold further comprises instructions for:
when the traffic control threshold is set to the first traffic control threshold, controlling the traffic of the application to be less than or equal to the first traffic control threshold; or
when the traffic control threshold is set to the second traffic threshold, controlling the traffic of the application to be less than or equal to the second traffic control threshold.

8. The device according to claim 5, wherein the memory further includes instructions that, when executed by the one or more processors, cause the device to perform network abnormality processing on the application when the traffic of the application is greater than a predefined value.

9. A non-transitory computer readable storage medium in conjunction with a client device, the computer readable storage medium storing one or more programs for controlling network traffic from an application running on the client device, the one or more programs including instructions for:
determining whether the application is in a user-selected traffic control operating mode;
when the application is in the user-selected traffic control operating mode, performing traffic control on the application, the traffic control including:
monitoring a user behavior status of the application, wherein monitoring the user behavior status includes determining that the user behavior status is one of an active state and an inactive state, and wherein determining the user behavior status of the application comprises:
monitoring a current operating status of the application;

when the application is currently in a foreground operating state, determining that the user behavior status of the application is the active state; and when the application is currently in a background operating state, determining that the user behavior status of the application is the inactive state;

setting a traffic control threshold in accordance with the determined user behavior status of the application; and controlling traffic of the application by using the traffic control threshold;

wherein:

when the user behavior status of the user is the active state, the traffic control threshold is set to a first traffic control threshold; and when the user behavior status of the user is the inactive state, the traffic control threshold is set to a second traffic threshold that is less than the first traffic threshold when the application is not in the user-selected traffic control operating mode, forgoing performing the traffic control on the application.

10. The non-transitory computer readable storage medium according to claim 9, wherein the instruction for determining that the application is in the background operating state includes instructions for determining that the application has remained in a background of the client device for at least a predefined amount of time.

11. The non-transitory computer readable storage medium according to claim 9, wherein the instruction for controlling the traffic of the application by using the determined traffic control threshold further include instructions for:

when the traffic control threshold is set to the first traffic control threshold, controlling the traffic of the application to be less than or equal to the first traffic control threshold; and when the traffic control threshold is set to the second traffic threshold, controlling the traffic of the application to be less than or equal to the second traffic control threshold.

* * * * *